THIN FILM MAGNETIC ENERGY ACCUMULATOR

Filed April 24, 1963

INVENTOR.
DONALD E. ANDERSON
BY
Moore, White & Burd
ATTORNEYS

United States Patent Office 3,205,461
Patented Sept. 7, 1965

3,205,461
THIN FILM MAGNETIC ENERGY ACCUMULATOR

Donald E. Anderson, St. Paul, Minn., assignor to The Regents of the University of Minnesota, Minneapolis, Minn., a corporation of Minnesota Filed Apr. 24, 1963, Ser. No. 275,272
10 Claims. (Cl. 333—76)

This invention relates to a thin film superconducting magnetic energy accumulator or superconducting resonant device. More particularly, this invention relates to a resonant device comprised of multiple layers of thin deposited films of superconducting alloy interleaved with thin deposited films of a dielectric material alternating with thin deposited films of a conductive metal barrier material.

Many applications suggest themselves for resonant L–C tuned circuits of extremely high energy storage and low internal losses (or high Q). In particular, the device described herein has *no* energy loss associated with energy storage in the inductive mode, and only modest losses associated with energy storage in the capacitive mode.

The invention is illustrated by the accompanying drawings in which the same numerals refer to corresponding parts and in which.

Broadly stated, the magnetic energy accumulator or superconducting resonant device according to the present invention comprises a substrate having a multitude of turns of at least one thin continuous unbroken deposited film layer of a superconducting alloy which are spaced apart from one another by a dielectric comprised of a plurality of thin continuous unbroken deposited conductive metal barrier film layers separated from each other and from the superconducting alloy layers by deposited thin film layers of solid dielectric material. The individual film layers may range in thickness from about 50 A. to 5,000 A. and the total number of turns of the winding may vary from about $10^3$ to about $10^6$.

Figure 3:
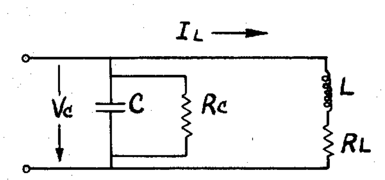
FIGURE 3 is a circuit diagram of a normal or conventional lumped-constant resonant circuit; and, FIGURE 4 is a circuit diagram representative of the equivalent circuit of the resonant device according to the present invention.

The circuit diagram shown in FIGURE 3 illustrates a normal lumped-constant resonant circuit, with an inductor L and capacitor C connected in parallel. While one desires ideally a circuit with pure L and C, losses are usually represented by a shunt resistance $R_c$ paralleling C; $R_c$ describing the internal resistance of the capacitor, and a resistance $R_L$ in series with L, describing losses associated with current flow through windings. Normally $R_L$ represents the heaviest energy loss in the tuned circuit.

Operation of a tuned circuit can be analyzed in terms of peak energy storage $W_{total}$, in joules or watt-seconds; total power lost per cycle in watts, and the resonance frequency, $f_0$ cycles per second. The resonant mode is then described by a periodic shift of $W_{total}$ between two internal modes of energy storage.

One mode of storage is in the inductance (or more properly, in the magnetic field caused by current flow through the inductor). This is described as $$W_L=\frac{1}{2}LI_L^2 \text{ joules}$$

where L is in henries and $I_L$ is in amperes. The other mode of storage is in the capacitor (or, analogous to the inductive storage, in the electric field caused by the voltage across the capacitor). This is described as $$W_C=\frac{1}{2}CV_C^2 \text{ joules}$$

where C is in farads and $V_c$ is in volts. The total energy remains constant, ignoring losses, at $W_{total}=W_L+W_c$, but surges back and forth between the two modes. Thus at certain instances $I_L^2$ is a maximum and $V_c$ is zero; a quarter of a resonant cycle later $V_c^2$ is a maximum and $I_L$ is zero.

Figure 4:
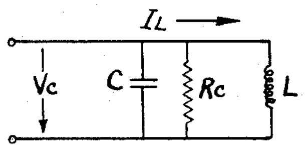

The object of the present invention is to produce a device wherein L and C are embodied in the same element and, further, in which $R_L$ is exactly zero. Finally, the device of the present invention is one in which the maximum permissible values of $W_L$ and $W_c$ for a given physical size, are orders of magnitude larger than realizable without breakdown of a normal capacitor and/or inductor. The equivalent circuit of the new device is shown in FIGURE 4.

Figure 1:
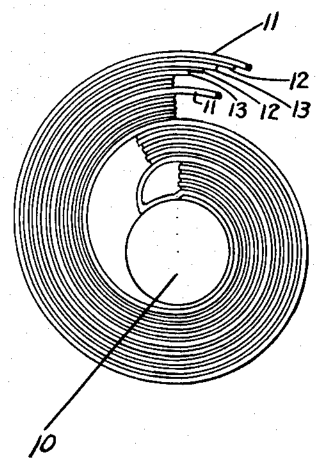
FIGURE 1 is an end elevation representative of a magnetic energy accumulating or resonant device according to the present invention.

Referring now to FIGURE 1, the device of the present invention consists of a substrate 10 having thereon many thin evaporated layers 11 of a superconducting alloy, of dielectric or insulating layers 12, and of barrier layers 13 internal to the dielectric, with the particular configuration depending upon the desired resonant frequency and contemplated power levels. The structure represents in a sense an interleaved arrangement of thin film layers described and claimed in my copending application Serial No. 260,669, filed February 25, 1963, for use as a capacitor and in my copending application Serial No. 266,584, filed March 20, 1963, for use as a superconducting inductor or solenoid.

The superconducting alloy layers 11 are deposited by thin film deposition techniques which are known in the art and which *per se* form no part of the present invention. These alloy layers are deposited by atomic beam sources such as thermal evaporators in vacuum or targets sputtered by ion bombardment in a gas plasma. Multiple sources of the constituents of the alloy are used to deposit thin alloy films on a rotating substrate. The properties of the alloy (thickness, train, homogeneity, and composition) are controlled by varying the source rates and the rate of rotation of the substrate.

Exemplary hard superconducting alloys include niobium-tin, niobium-zirconium, niobium-titanium, vanadium-gallium, vanadium-silicon and the like, as are known in the art. Each layer of metallic alloy film comprising the inductor has a thickness of the order of about 50 A. to 5,000 A.

Exemplary insulating layer material includes aluminum oxide, silicon oxide, magnesium oxide, tantalum pentoxide, titanium dioxide and the like. These materials are also deposited by evaporation or sputtering as known in the art. Alternatively, the insulating layers can be produced by continuously oxidizing the surface of a deposited metal layer, for example, by directing oxygen ions onto the surface of an evaporated metallic film.

The internal barrier layers 13 are composed of a conducting material such as aluminum, tantalum, magnesium, titanium, silver and the like. These layers are deposited by thin film deposition techniques in the same manner as the alloy film layers. The barrier layers may also be formed from superconducting alloy. Each layer pair of conducting metallic barrier film and dielectric film is extremely thin. Each film layer has a thickness of the order of about 50 A. to 5,000 A.

As described in my aforesaid copending applications Serial No. 260,669, these spaced apart internal metallic avalanche barrier layers 13 of extreme thinness interposed between dielectric layers 12 of extreme thinness function to prevent the creation of avalanche conditions for charge carriers and resulting dielectric breakdown. The internal metallic avalanche layers 13 need not be connected. They are embedded in the dielectric out of contact with the superconducting alloy layer of the inductor winding.

Figure 2:
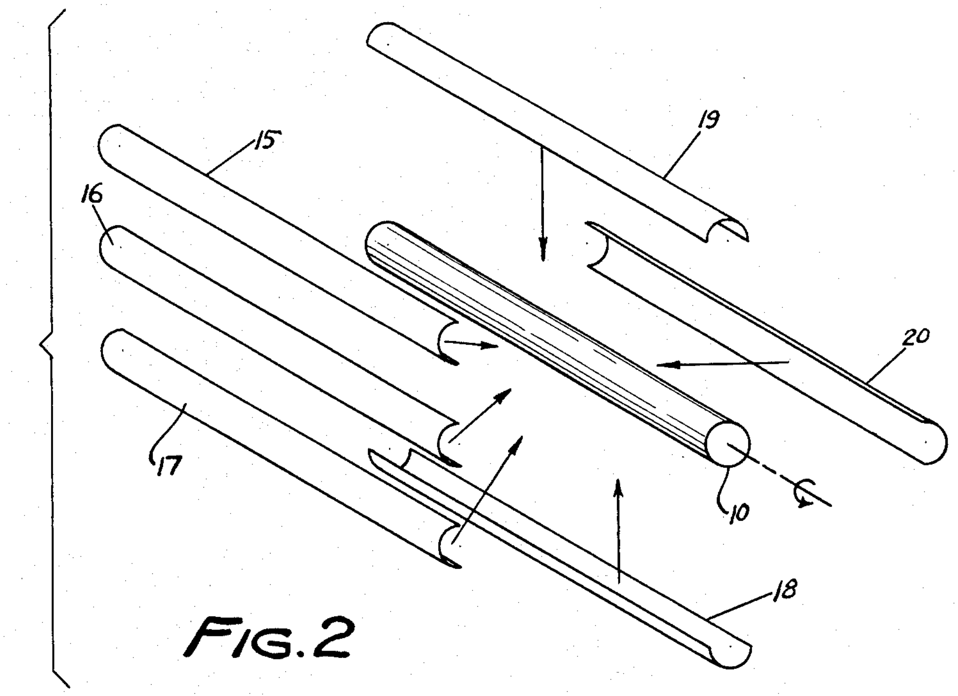
FIGURE 2 is a schematic representation of means by which a resonant device according to the present invention may be fabricated.

In FIGURE 2 there is shown schematically one means by which the superconducting resonant device according to the present invention is produced. The substrate 10, which is preferably cylindrical, and is rotatable, is positioned within the range of a plurality of metallic alloy deposition sources 15, 16 and 17, a pair of insulation deposition sources 18 and 19 and a metallic barrier layer deposition source 20. The substrate 10 may be solid or tubular and may be formed from an insulating material or from a bulk hard superconducting alloy.

The individual metallic sources 15, 16 and 17 are sources of the alloy constituents such as tantalum, tin, titanium, vanadium, gallium, indium, niobium, zirconium, silicon and the like. These individual sources may be thermal evaporators. Alternatively, the metallic constituents may be deposited as the result of sputtering of appropriate targets with gas ions. For example, tantalum may be deposited by bombarding a tantalum surface with $A^+$ ions. The barrier layer source 20 is a similar source of a metal, such as aluminum, tantalum, magnesium, titanium, silver, etc., or an alloy.

The insulation sources may likewise be thermal evaporators for direct deposition of an insulating material, such as silicon oxide (SiO). Alternatively, the insulating layers may be deposited by sputtering of appropriate targets with gas ions. For example, magnesium oxide or aluminum oxide surfaces may be bombarded with $A^+$ ions. The insulating layers can also be produced by continually oxidizing the surface of the metallic films, for example by directing oxygen ions onto the surfaces of an evaporated metallic film, whether an alloy or a single metal.

As the substrate 10 rotates between the several sources, an alloy layer is deposited by the co-mingling of the metallic substances from sources 15, 16 and 17. A dielectric film is deposited on top of the alloy layer from insulation source 18. A metallic barrier layer is deposited on top of the first dielectric layer from metallic source 20. A further dielectric layer is deposited on the metallic barrier layer. As rotation of the substrate continues these alternating layers of alloy-dielectric-barrier-dielectric etc., are deposited simultaneously to build up a series of continuous spiral windings. Where additional layers are desired or necessary, as in a device having the geometry of FIGURE 1, a separate set of individual alloy sources is required for each layer of superconducting alloy and a separate source is necessary for each layer of dielectric material and each barrier layer. The metallic sources are shielded from the insulation sources so as to avoid comingling of the conducting and insulating materials to insure deposition of distinct layers.

In the structure, having the geometrical configuration of FIGURE 1, the alloy layer 11 is double wound and the inner ends of these layers are connected so as to be in electrically conductive relationship. The free ends of the layer 11 serve as input-output terminals. Current may flow inwardly through one-half of the alloy layer and back out through the interleaved other half. These turns of the alloy layer are separated by a plurality of unconnected barrier layers 13 which are separated from each other and from the alloy layers by means of thin deposited dielectric films 12.

Because of the extreme thinness of the deposited films, the drawings are necessarily grossly exaggerated as to scale. Only a small fraction of the total number of film layers which are deposited can be shown. These layers may number thousands or even millions in the completed element. In a typical device, having the configuration of FIGURE 1, the layers may be of the order of $10^{-5}$ cm. thick and the total number of layers may be of the order of $10^{-5}$.

The alloy films have been deposited in laminar fashion in which extremely thin films of the alloy components are deposited separately and alternately and repeated several times to produce an alloy layer of desired thickness. For example, a 1,000 A. layer of niobium-zirconium alloy is deposited in the form of five 100 A. sub-layers of niobium alternating with five 100 A. sub-layers of zirconium. This produces an alloy which is deliberately non-homogeneous. This requires a separate source for each sub-layer. An intentionally non-homogeneous alloy may be deposited from a single set of alloy component sources operated alternately. The alloy has also been deposited in homogeneous fashion with atoms each of the alloy components arriving at the suface continuously and simultaneously in the desired ratio.

Certain modes of operation are possible with the device of FIGURE 1, whose circuits shown diagrammatically in FIGURE 4, which are impractical or impossible with the normal resonant circuits. One mode of operation consists of energy storage from a limited-power-D.C. source for an extended period of time during which an intense magnetic field is established in L with almost 100% conversion efficiency. If the input is then open-circuited, the device will resonate at huge amplitude with very constant frequency and only modest internal energy dissipation. This can be coupled out to drive a load (an antenna, for instance) at extremely high power levels for short periods of time. This one device then serves both as an accumulator and as a stored D.C.-to-A.C.-converter, both with very high efficiency and a very small volume and weight for a given power level.

The exact geometry (number of layers, number of barrier layers, etc.) may be adjusted at will to provide a desired design. The input-output terminals can also be varied; for example, if desired for use as an RF transmitter, the outer layers might be tapered smoothly into a "horn antenna" shape or a separate antenna may be coupled to the terminals as shown.

An alternative geometrical design of superconducting resonant device according to the present invention is similar to that shown in FIGURE 1 but with a single winding of superconducting alloy film with interposed alternating dielectric and metallic barrier layers. In this configuration, the outer end of the superconducting alloy film serves as one terminal and a lead out conductor from the inner end of the winding serves as the other terminal. Such a configuration is similar to that shown in FIGURE 2 of my copending application Serial No. 266,584, with the exception that the present design includes interposed metallic barrier layers between the turns of the superconducting alloy winding.

The invention is further illustrated, but not limited, by the following examples:

*Example one*

A thin film superconducting resonant device is produced by depositing a niobium-zirconium alloy in spiral wound form on a rotating fire polished glass substrate. The turns of this alloy winding are separated from each other by alternate deposited layer films of silicon monoxide (SiO) and aluminum barrier layers. The superconducting alloy has the composition $Nb_xZr_{1-x}$ where $x$ indicates the mole fraction of niobium in the alloy. The alloy is deposited by thermal evaporation in a high vacuum. A sample of niobium in the form of a cylinder approximately one-half inch in diameter and one inch long is heated by bombarding the center of one face of the cylinder with a focused electron beam. Electron currents of the order of 50 ma. are drawn to the source held at +5,000 volts with respect to a heated tungsten filament. The niobium cylinder is enclosed within concentric spaced apart tubes of tantalum which serve as heat shields. A molten pool of niobium is formed contained in a "crucible" of the solid portion of the niobium cylinder. This molten pool is heated well above the melting point of niobium to yield the desired vapor pressure for deposition. A similar zirconium sample is heated in the same fashion. These two evaporators are mounted side by side so that they both face the rotating glass substrate suspended above them. The alloy component evaporators are operated simultaneously and continuously to deposit a continuous spiral thin film winding on the rotating substrate. To insulate successive turns of the alloy layer of the winding from each other end from the avalanche barrier layers, an insulating layer of silicon oxide (SiO) is deposited progressively on top of the deposited alloy film by direct evaporation of silicon oxide from a heated tungsten vessel. Each barrier layer is deposited by thermally evaporating aluminum on top of the insulating layers of silicon oxide in the same manner as the niobium and zirconium components of the alloy are deposited. A further layer film of silicon oxide is deposited by evaporation on top of each aluminum barrier layer. A separate aluminum source is provided for each desired barrier layer and separate dielectric sources are provided for each dielectric film layer.

These dielectric sources are shielded from the alloy component sources and from the barrier layer sources so as to deposit the silicon oxide films immediately on top of the deposited alloy layer and barrier layer while avoiding co-mingling of the evaporated materials. Both metallic and dielectric films are deposited to a thickness of about 1,000 A. The simultaneous thermal evaporation processes are continued until a structure of the desired number of turns, for example 100,000, has been produced.

*Example two*

Superconducting alloy films have also been produced by sputtering in an argon atmosphere. According to this method, a niobium-zirconium alloy is formed by placing targets of niobium and zirconium in an argon discharge. The argon discharge itself is produced by admitting pure argon to a previously evacuated system to a pressure of the order of $10^{-3}$ mm. Hg. Tungsten filaments with tantalum shields within the evacuated system are heated to about 2,000° C. to provide a source of electrons. A potential of +30 volts is applied to tantalum anode rings or discs disposed between the heated filaments and the niobium and zirconium targets. Under these conditions electrons are emitted from the filaments and moved toward the anode rings. An axial magnetic field of about 1,000 gauss is produced by an external permanent magnet. This magnetic field traps electrons in the region of the anodes and insures intense ionization of the argon atoms. Positive argon ions are made to bombard the niobium and zirconium targets by holding those targets at potentials several hundred volts negative with respect to the discharge. The yield of niobium or zirconium sputtered for a given ion current is a known function of the potential through which the argon ions have been accelerated. Thus, the amount of niobium and zirconium deposited on the substrate can be quantitatively controlled. In this example the alloy is deposited on a fire polished glass substrate. The insulating layers are deposited in the same atmosphere in the same manner by bombardment of a target of dielectric material, such as aluminum oxide and the barrier layers are deposited by bombardment of a target of conducting metal, such as aluminum.

* * * * *

Although illustrated with particular reference to niobium-zirconium alloy films, other superconducting alloys such as niobium-tin, niobium-titanium, vanadium-titanium, vanadium-silicon, vanadium-gallium, etc., are produced in the same manner. Alloy films of the formula in $Nb_xZr_{1-x}$ have been formed both by thermal evaporation and sputtering with $x$ varying from 1.0 to 0.25. The current density which can flow in such films has been found to be over $10^6$A./cm.$^2$ of film cross section. In addition to the examples given, the several film layers may be deposited according to any of the examples of my copending applications.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A multi-layer thin film superconducting magnetic energy accumulating or resonant device comprised of a substrate, a continuous unbroken electrically conductive metallic winding extending in a multitude of turns around said substrate, said winding being composed of at least one thin continuous unbroken deposited film layer of superconducting alloy, at least one thin continuous unbroken deposited film barrier layer of conductive metal disposed between but unconnected to the turns of said alloy film layer, and a thin unbroken deposited film layer of solid dielectric material interposed between each adjacent pair of conductive film layers.

2. A multi-layer thin film superconducting magnetic energy accumulating or resonant device comprised of a substrate, a continuous unbroken electrically conductive metallic winding extending in a multitude of turns around said substrate, said winding being composed of at least one thin continuous unbroken deposited film layer of superconducting alloy, a plurality of thin continuous unbroken deposited film barrier layers of conductive metal disposed between the turns of said alloy film layer, at least some of said conductive metal film barrier layers being unconnected to any other of said conductive film barrier layers, and a thin unbroken deposited film layer of solid dielectric material interposed between each adjacent pair of conductive film layers.

3. A superconducting magnetic energy accumulating or resonant device according to claim 2 further characterized in that said winding includes a pair of spaced apart interleaved continuous spiral wound deposited film layers of superconducting alloy, the outer ends of said pair of alloy film layers serving as input-output terminals, the inner ends of said pair of alloy film layers being connected so as to be electrically conductive whereby current may flow through the alloy film layers between the terminals.

4. A superconducting magnetic energy accumulating or resonant device according to claim 2 further characterized in that each of said deposited film layers is of the order of about 50 A. to 5,000 A. in thickness.

5. A superconducting magnetic energy accumulating or resonant device according to claim 2 further characterized in that said device has from about $10^3$ to about $10^6$ turns of superconducting alloy film layers.

6. A superconducting magnetic energy accumulating or resonant device according to claim 2 further characterized in that said superconducting alloy film layers are composed of an alloy of composition $M_xM_{1-x}^1$ where M is a metal selected from the group consisting of niobium and vanadium and $M^1$ is a metal selected from the group consisting of tin, zirconium, gallium, titanium and silicon, and $x$ indicates the mole fraction of M in the alloy and is a number between 0.25 and 1.0.

7. A superconducting magnetic energy accumulating or resonant device according to claim 2 further characterized in that said deposited film barrier layers are composed of superconducting alloy.

8. A multi-layer thin film superconducting magnetic energy accumulating or resonant device comprised of a substrate, a continuous unbroken electrically conductive metallic winding extending in from about $10^3$ to $10^6$ turns around said substrate, said winding being composed of at least one thin continuous unbroken deposited film layer of superconducting alloy, a plurality of thin continuous unbroken deposited film barrier layers of conductive metal disposed between the turns of said alloy film layer, at least some of said conductive metal film barrier layers being unconnected to any other of said conductive film barrier layers, and a thin unbroken deposited film layer of solid dielectric material interposed between each adjacent pair of conductive film layers, each of said deposited film layers being of the order of about 50 A. to 5,000 A. in thickness.

9. A superconducting magnetic energy accumulating or resonant device according to claim 8 further characterized in that said winding includes a pair of spaced apart interleaved continuous spiral wound deposited film layers of superconducting alloy, the outer ends of said pair of alloy film layers serving as input-output terminals, the inner ends of said pair of alloy film layers being connected so as to be electrically conductive whereby current may flow through the alloy film layers between the terminals.

10. A superconducting magnetic energy accumulating or resonant device according to claim 8 further characterized in that said deposited film barrier layers are composed of superconducting alloy.

References Cited by the Examiner

UNITED STATES PATENTS

| | | | |
|---|---|---|---|
| 3,015,041 | 12/61 | Young | 338—32 |
| 3,090,023 | 5/63 | Brennemann et al. | 340—173 |

OTHER REFERENCES

Kolm et al.: "High Magnetic Fields," the M.I.T. Press, John Wiley & Sons, Inc., New York, 1962 (pages 592–596).

JOHN F. BURNS, *Primary Examiner.*